US010022780B2

(12) United States Patent
Hubauer

(10) Patent No.: US 10,022,780 B2
(45) Date of Patent: Jul. 17, 2018

(54) PRODUCING A METAL COMPONENT WITH A CASTING-AND-FORMING TOOL

(71) Applicant: MUBEA CARBO TECH GmbH, Salzburg (AT)

(72) Inventor: Werner Hubauer, Tumelsham (AT)

(73) Assignee: Mubea Carbo Tech GmbH, Salzburg (AT)

( * ) Notice: Subject to any disclaimer, the term of this patent is extended or adjusted under 35 U.S.C. 154(b) by 190 days.

(21) Appl. No.: 14/484,695

(22) Filed: Sep. 12, 2014

(65) Prior Publication Data
US 2015/0074983 A1    Mar. 19, 2015

(30) Foreign Application Priority Data
Sep. 16, 2013 (EP) .................................... 13184634

(51) Int. Cl.
*B21J 5/00* (2006.01)
*B22D 15/00* (2006.01)
(Continued)

(52) U.S. Cl.
CPC ............ *B21J 5/002* (2013.01); *B22D 15/005* (2013.01); *B22D 18/02* (2013.01); *B22D 27/04* (2013.01);
(Continued)

(58) Field of Classification Search
CPC ... B21J 5/002; B21J 5/004; B21J 9/02; B21K 1/32; B22D 15/005; B22D 17/002;
(Continued)

(56) References Cited

U.S. PATENT DOCUMENTS 5,143,141 A * 9/1992 Frulla .................... B22D 18/02
164/120
5,301,739 A * 4/1994 Cook ..................... B22D 27/13
164/120
(Continued)

FOREIGN PATENT DOCUMENTS

CN     1572397 A     2/2005
CN   200954537 Y    10/2007
(Continued)

OTHER PUBLICATIONS

Translation of DE3812740 (cited in IDS), generated Sep. 26, 2016.*

*Primary Examiner* — Matthew P Travers
(74) *Attorney, Agent, or Firm* — Bejin Bieneman PLC

(57) ABSTRACT

A metal component is produced using a casting-and-forming tool by casting a melt of a metal alloy into the casting-and-forming tool, wherein the melt is poured from above into a base part or reservoir of the casting-and-forming tool at a first pressure, applying pressure to the melt between the base part and an upper part while the melt is solidifying to a component, wherein the solidifying melt is pressurized at a second pressure, which is larger than the first pressure, when the melt is at least partly, i.e., mostly solidified to form a component compressing the component by relative movement of the base part to the upper part so as to compress the component with a third pressure, which is higher than the second pressure.

11 Claims, 5 Drawing Sheets

(51) Int. Cl.
*B22D 39/00* (2006.01)
*B22D 27/11* (2006.01)
*B22D 27/04* (2006.01)
*B22D 18/02* (2006.01)
*B60B 3/06* (2006.01)
*B21K 1/32* (2006.01)

(52) U.S. Cl.
CPC .............. *B22D 27/11* (2013.01); *B22D 39/00* (2013.01); *B21K 1/32* (2013.01); *B60B 3/06* (2013.01); *B60B 2310/202* (2013.01); *B60B 2310/208* (2013.01); *Y10T 29/49503* (2015.01); *Y10T 29/49988* (2015.01); *Y10T 29/5184* (2015.01)

(58) Field of Classification Search
CPC .............. B22D 17/007; B22D 17/2038; B22D 17/2218; B22D 18/02; B22D 27/11; B22D 27/04; B60B 3/06; B60B 2310/202; B60B 2310/20; Y10T 29/49988; Y10T 29/5184; Y10T 29/49973; Y10T 29/49503; Y10T 29/49504
See application file for complete search history.

(56) References Cited

U.S. PATENT DOCUMENTS

| | | | | |
|---|---|---|---|---|
| 5,647,426 | A | * | 7/1997 | Prieto ............... B22C 9/28 164/122.1 |
| 5,722,165 | A | * | 3/1998 | Kobayashi ............ B21K 1/28 29/894.32 |
| 5,729,883 | A | | 3/1998 | Yoshioka et al. |
| 2008/0041552 | A1 | * | 2/2008 | Dubay ............. B22D 17/2272 164/312 |
| 2016/0214429 | A1 | * | 7/2016 | Gao ................ B22D 21/007 |

FOREIGN PATENT DOCUMENTS

| | | |
|---|---|---|
| CN | 101468378 A | 7/2009 |
| CN | 101787472 A | 7/2010 |
| DE | 38 12 740 A1 | 10/1989 |
| DE | 102006036369 A1 | 2/2008 |
| DE | 102011119643 A1 | 5/2013 |
| EP | 0338419 A1 | 10/1989 |
| EP | 0 423 447 A2 | 4/1991 |
| FR | 2 504 424 A1 | 10/1982 |
| JP | 2005-074461 A | 3/2005 |
| TW | 200726544 A | 7/2007 |

* cited by examiner

PRODUCING A METAL COMPONENT WITH A CASTING-AND-FORMING TOOL

CROSS-REFERENCE TO RELATED PATENT APPLICATIONS

This application claims the benefit of priority from European Patent Application No. 13184634.7, filed Sep. 16, 2013, and entitled "Method and device for producing a metal component by using a casting and forming tool." The entire contents of said the foregoing European application are hereby incorporated herein by reference in their entirety.

BACKGROUND

The present disclosure relates to a method and a device for producing a metal component with a casting-and-forming tool.

From DE 10 2006 036 369 A1 a melting-, casting- and pressing-method for manufacturing highly stressed components is known. For this method, a starting material is introduced into a closed system under an inert gas, heated, melted and quantified. Then the primary material is transported via a pressure chamber into a mold cavity of a casting mold, where it solidifies under increased pressure with formation of a casting microstructure. The component microstructure is made to flow after the solidification by a further increased pressure at an altered mold cavity and thus converted at least partially into a kneading microstructure. After further cooling and opening of the mold, the component is removed having its final dimensions.

From DE 38 12 740 A1, a casting-forging-method is known, in which a lower die is used for casting as well as for forging. Together with an upper casting mold part the lower die forms the casting cavity and together with the upper die the lower die forms the forging mold. With this method high quality metal components with a high dimensional accuracy and high strength can be manufactured quickly and with less necessary machining.

From U.S. Pat. No. 5,729,883 A a method for manufacturing a disc-like forging component as a preform for a vehicle wheel from an aluminum alloy is known. The method comprises the steps of casting a material into a predefined mold, and subsequently forging the material to a forged component. The degree of deformation during the forging is not less than 15%.

From DE 10 2011 119 643 A1 a method for manufacturing a blank for a vehicle wheel by forming by means of a forging process is known. A step of casting is carried out before the forging process, in which a casting blank, differing in its shape from a simple metal cylinder, is produced. The casting blank is pressed by the forging process into a final shape and is deformed to the final blank. The casting can be carried out by gravity casting, low pressure casting, or sand casting. After the forging, the outer material part of the final blank is rolled for manufacturing a rim well by a flow molding process to the front rim flange and rear rim flange.

SUMMARY

Proposed herein is a method for manufacturing a metal component by using a casting-and-forming tool, which method can be carried out easily and cost effectively and which provides for high strengths of the final component. Further a corresponding device has a simple structure and results in low tooling costs and provides for the production of near-net-shape components with good strength properties.

A method for producing a metal component using a casting-and-forming tool comprises the steps of: casting a melt of a metal alloy into the casting-and-forming tool, wherein the melt is poured from above into a base part or a reservoir of the casting-and-forming tool at a first pressure (P1); applying pressure to the melt between the base part and an upper part of the casting-and-forming tool while the melt is solidifying, wherein the solidifying melt is pressurized with a second pressure (P2) that is higher than the first pressure (P1); and, when the melt is at least partly, i.e., mostly solidified to form a component, compressing of the component by moving at least one of the base part and the upper part relative to another one of the base part and the upper part, wherein the component is compressed with a third pressure (P3), that is higher than the second pressure (P2).

An advantage of the presently disclosed method is that components with high strength can be manufactured within a short time. The pressure force application after casting contributes to a fine microstructure with small crystals. Because of the second pressure (P2) exerted on the melt, respectively because of the relative movement of the cold upper part into the base part, the crystal growth is stunted in the area of the component-edge shell and the produced crystals are continuously broken up to smaller crystals. By means of the subsequent compressing at a higher third pressure (P3), a flowing of the material is produced, wherein pores in the material are closed and the production of new pores is prevented or minimized. In total, a fine microstructure with high strength is produced. The pressure force application can be carried out with a force of less than 10 kN. During the compression a force of preferably more than 1000 kN is applied to the component. A further advantage is that the manufactured components have, because of the compression, a shape that is a near-to-net shape, which leads to an excellent material utilization. Furthermore, the products manufactured with said method have a high dimensional accuracy and surface finish. The tool costs are low, as different process steps are carried out with one tool. The method is especially suitable for manufacturing wheel rims for motor vehicles, wherein the manufacture of other components is of course not excluded.

As a material for manufacturing the component, forgeable alloys may be used, wherein the use of casting alloys is not excluded. Metal alloys of light metal, like aluminum, magnesium and titanium are used as preferred materials.

According to an embodiment, casting or filling of the melt into the mold chamber formed by the tool can be carried out at normal pressure (P1), i.e. atmospheric pressure in the mold cavity. This can be valid for placing of the whole melt amount into the mold chamber of the tool. It is possible that the upper part of the casting-and-forming tool is held in a partially opened position relative to the base part during casting of the melt. In other words, base part and upper part are not yet completely closed during the casting, but can be moved towards each other to an extent that the filling height of the metal is at a corresponding height in all flow channels of the base part, and at the following compression and flow of the metal alloy, no already solidified metal faces contact each other. The metal alloy can also be designated as material.

The filling takes place from the filling container or dosing unit, respectively, in which the melt volume necessary for manufacturing the required component is made available. The filling process of the melt into the casting tool, or the renewed filling process of the filling container after the casting, respectively, preferably takes place controlled by sensors. The casting can take place in the form of a gravity casting, which means only using the gravitational force of the melt from the filling container arranged above into the casting tool arranged below. However, in principle, low pressure casting is also possible. A filter can be provided in the flow path between the filling container and the casting tool, which retards the casting flow and thus leads to a smooth or constant flow behavior of the melt into the base part. The filter can be provided for example in the form of a wire mesh made from steel, which can be arranged at the lower end of the filling container. At the outlet of the filling container, a cooling unit can be provided, with which the melt can be cooled during exiting from the filling container. Thus, the liquid metal alloy can already be transferred into a semi-solid-state during filling the base part.

The casting of the melt into the casting- and forming tool can be carried out in an inert gas atmosphere. By means of an inert gas atmosphere, the formation of an unwanted oxide layer during the casting can be prevented. The use of an inert gas depends on the to be processed alloy. In alloys with low tendency for forming an oxide layer, the use of an inert gas can be avoided.

According to an embodiment, vibrations can be introduced into the casting-and-forming tool during and/or after casting. Thus an improved microstructure with high strength can be formed. By introducing vibrations, crystal boundaries form early and thus relatively small crystals are formed. Furthermore, the flowing in is quicker and the rising of the melt in the base part takes place constantly, which also has an advantageous effect on the microstructure.

It is possible that at least a portion of the upper part is set to a lower temperature than at least a portion of the base part. This can apply for at least one of the steps of casting and/or applying pressure force and/or compressing. Because of the higher temperature in the base part, the melt flowing into the base part remains in the liquid phase for a longer time than the parts of the melt contacting the upper part. At the same time a quick quenching of the material takes place at the cooler tool parts or tool portions, which leads to a microstructure with high strength. The solidification starts at the upper part in direction of the base part and the inner of the tool, respectively.

The base part or at least partial portions of the base part, is heated preferably to a temperature that corresponds to two-thirds (⅔) of the solidus temperature of the metal alloy, ±25% of the solidus temperature. The heating of the base part can, for example, take place in a furnace before casting. The temperature difference between the upper part and the base part can be, for example, more than 200° C. during casting.

For manufacturing a rotational symmetrical body, the base part can have a base portion and an annular casing portion, wherein the casing portion is set preferably to a lower temperature than the base portion during solidifying and/or during compression. The base portion and the casing portion can be formed integrally or as separate parts which are subsequently connected to each other.

According to a preferred embodiment, the pressure force application of the melt takes place at a component-shell-temperature (T2) below the liquidus line (TL) and/or above the solidus line (TS) of the metal alloy (TS<T2<TL), wherein the process generally can also start before reaching the liquidus line (TL), for example at 3% above the liquidus line. The component-shell-temperature in this connection means a temperature of the component in a layer area, or shell solidifying or solidified from the melt, respectively. The solidification takes place from the outside to the inside, so that the temperature of the solidifying component is higher at the inside than in the edge layer. The step of applying pressure is carried out at a second pressure (P2), which is higher than the atmospheric pressure and can, for example, be applied by the weight of the upper part acting onto the melt. The pressure leads to a flowing of the solidifying material, because of which the process can also be designated as flow forming. Before the pressure force application, respectively at the beginning of the pressure force application, the material is still liquid. At the end of the pressure application, the material is at least partially doughy or has, starting from the edge layer area of the component to the component inner, a kneading microstructure. The pressure application can take place upon a relative movement of the upper part towards the base part. For a quick process it is in this case advantageous, if the pressure application is carried out up to reaching a defined first distance of the two tool parts from each other within a time of less than 10 seconds. After reaching this first distance, a holding time can be started until the melt is at least largely solidified and the semi-solid-state of the metal alloy is present, respectively.

During the step of compressing, after the component is at least largely solidified from the melt, the component is acted upon with an increased third pressure (P3), which is also produced by relative movement of the base part towards the upper part, or vice versa. The step of compression can also be designated as post-compressing. "At least largely solidified" means that the component has already been cooled from the liquid phase so far that the structure is at least between the liquid and solid phase. The material has in this already partially solidified state a kneading texture. This state is also referred to as a semi-solid state.

The step of compressing can take place at a component-shell-temperature (T3) that is lower than the temperature of the metal alloy during the step of applying pressure (T3<T2). The lower boundary of the temperature (T3) for carrying out the compressing is preferably half of the solidus temperature (TS) of the metal alloy (T3>0.5TS). Partial areas of the component can also have a temperature outside of the temperature (T3). During the process of compressing the temperature of the component, respectively of the base part and/or of the upper part, can be controlled. Temperature sensors, which are mounted especially close to the inner wall of the casting- and forming tool, can be used to determine the temperatures. The end of the forming process can be defined by reaching a final position of the relative movement of the upper part towards the base part and by reaching a specific temperature.

According to an embodiment, the step of compression is carried out such that the component experiences, due to the compression respectively, a degree of deformation of less than 15%, especially less than 10%, more particularly of less than 5%. Because of the comparably low degrees of deformation, the deformation velocity is high, which has an advantageous effect on the time of manufacture. The material, further solidifying during compressing, forms especially small crystals because of the quick cooling under pressure force application, which leads to a high quality microstructure.

According to an embodiment, the step of compressing is carried out by moving the base part, while the upper part is held stationary. However, also a kinematic reversal is generally possible, which means holding the base part stationary and moving the upper part. Also, moving both parts relative to each other is possible. During compressing, the gap that is present between the base part and the upper part during the casting is completely closed or at least largely closed. The material below the already solidified areas which is still liquid or doughy is compressed by moving the tool parts towards each other, so that the formation of shrinkage cavities, blow-holes or micro pores is prevented or at least minimized in size and number. During compressing, the cavities can be "pressed-out" of the component, whereby the volume of the component is correspondingly reduced. This can count for, depending on the component and component area, between 20% to 80% of the cavities, pores, respectively. When using an aluminum alloy, the volume of the component areas can be reduced by more than three percent. A cavity, respectively pore reduced component with improved characteristic values is achieved.

As a further method step after compressing it can be provided: partial post-compressing of the completely solidified component, wherein post-compressing is achieved be moving a forging tool into the base part of the casting-and-forming tool, whereby the component is further compressed by the forging tool at least in partial areas and thus plastically deformed.

During the partial post-compressing the component is acted upon with larger forces than during the compressing. A forging-similar microstructure is produced in the post-compressed areas, which later can withstand higher loads. Insofar, the post-compressing can also be designated as a forging process. For the post-compression, the upper part of the casting-and-forming tool is lifted from the base part and then the forging tool is moved into the base part. Partial areas of the component, especially such that are subjected to higher loads in the operating condition, are plastically deformed and compressed by the forging tool. Because of the partial forging, in these highly loaded areas, a microstructure of the component with especially high strength is achieved. One or more forging stations are possible, depending on the required degree of deformation or strength. After the forging the component has a near-net-shape, so that the expenditure for post-processing steps like flow forming or machining is reduced.

The step of compressing and/or of partial post-compressing is preferably carried out such that the component is deformed by a total degree of deformation of less than 15%, preferably less than 10%, e.g., less than 5%, by said respective compressing and post-compressing processes. In this manner, the component is close to the required final contour.

After the partial post-compressing, a forming process such as flow forming or ironing of the component, or of partial areas of the component, can be provided as a further method step. By means of the forming process, outer or inner shapes with undercuts can be produced on the component which has previously been deformed and, as the case may be, post-forged in partial areas. For example the casing portion of a rotationally symmetrical component can be formed by means of flow forming into a rim flange of a wheel rim of a motor vehicle.

After flow forming, further method steps can follow, especially burring, shape-cutting or mechanical post-processing, quality control, etc., e.g., x-raying, and/or varnishing.

Further disclosed herein is a device for manufacturing a metal component, comprising: a casting-and-forming tool with a base part and an upper part; a dosing unit, with which a melt of a metal alloy from above into the base part or a reservoir of the casting-and-forming tool; a positioning mechanism, e.g., including a positioning member as disclosed below for holding the base part and the upper part at a defined position relative to each other at least during the casting of a metal alloy into the casting-and-forming tool; and a force application mechanism for producing a relative movement between base part and upper part, such that the component, which is at least partially solidified from the molten metal alloy, is deformable.

With the device the same advantages can be achieved as with the above named method, discussed above.

The casting-and-forming tool, which is also designated as casting mold, can be designed according to a modular design system, to keep short the set-up time for the casting. Several casting molds can be arranged on a rotatable circular table, so that several production stations can be run through. Before casting, the casting mold can be pre-heated in one station to the process temperature. A casting mold can be accommodated in a holding or transporting device, which is designed for the transport by using roller, chain, or belt conveyors. Also the handling by robots or gantry loaders are also possible for the conveyance.

The holding or transporting device is configured such that at least one of the base part and upper part is moveable along one axis, i.e., is not completely fixed in the holding or transport device. In the other two directions of axis said base part and/or upper part is fixed. The pressure force application mechanism can be especially formed such that the base part is moveable relative to the upper part, and the upper part is held stationary. The upper part and/or the base part can be provided with cooling units and temperature sensors, which can be connected after casting.

The base part, which can also be designated as lower mold, can be formed integrally. However alternatively, it can also be assembled from several separated parts, which however cannot be separated from each other during the manufacturing process. It is possible that the base part is formed rotationally symmetrically. The construction height of the base part is especially set such, that it can accommodate the whole liquid metal amount when the upper part is closed.

At least one of the parts, i.e., the base part or the upper part, has channels, so that the corresponding part can be set to a defined temperature. In this manner, the base part and the upper part can be set to different temperatures during the casting and during the solidification, respectively, which has a positive effect on the solidification behavior and thus on the microstructure of the solidified workpiece.

According to an embodiment, at least one of the parts of the casting-and-forming tool, i.e., the base part and/or the upper part, is formed free of undercuts. In this manner, an axial removal is possible. A further advantage is that the tool only requires two parts. A radial slider can be omitted.

It is possible that the device further comprises a forging tool that can be moved into the base part of the casting-and-forming tool, when the upper part is removed from the base part. Partial areas of the component can be partially post-compressed with the forging tool, which leads to especially high strengths in said areas.

According to a further embodiment, a vibration mechanism can be provided, with which vibrations can be introduced into the casting-and-forming tool, to achieve an especially good microstructure. This is especially of advantage in alloys with bad flow behaviour, like aluminum-kneading alloys.

According to yet a further improvement, a liquid metal dosing unit can be provided, with which the melt amount of the metal melt introduced into the casting-and-forming tool can be dosed. The dosing unit can have access to the base part only directly before and during the casting process. A temperature sensor can be provided on or in the filling container, with which the temperature of the melt can be determined.

DESCRIPTION OF THE DRAWINGS

Example embodiments are described in detail using the drawings, which show as follows.

DETAILED DESCRIPTION

Figure 5:
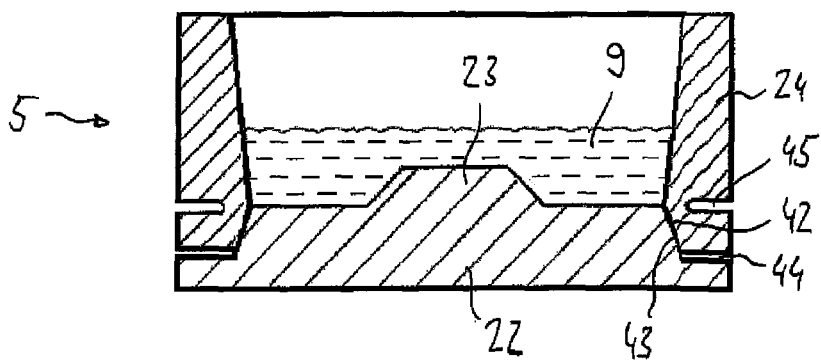
FIG. 5: the base part of the casting-and-forming tool of FIG. 4 in detail.
Figure 6:
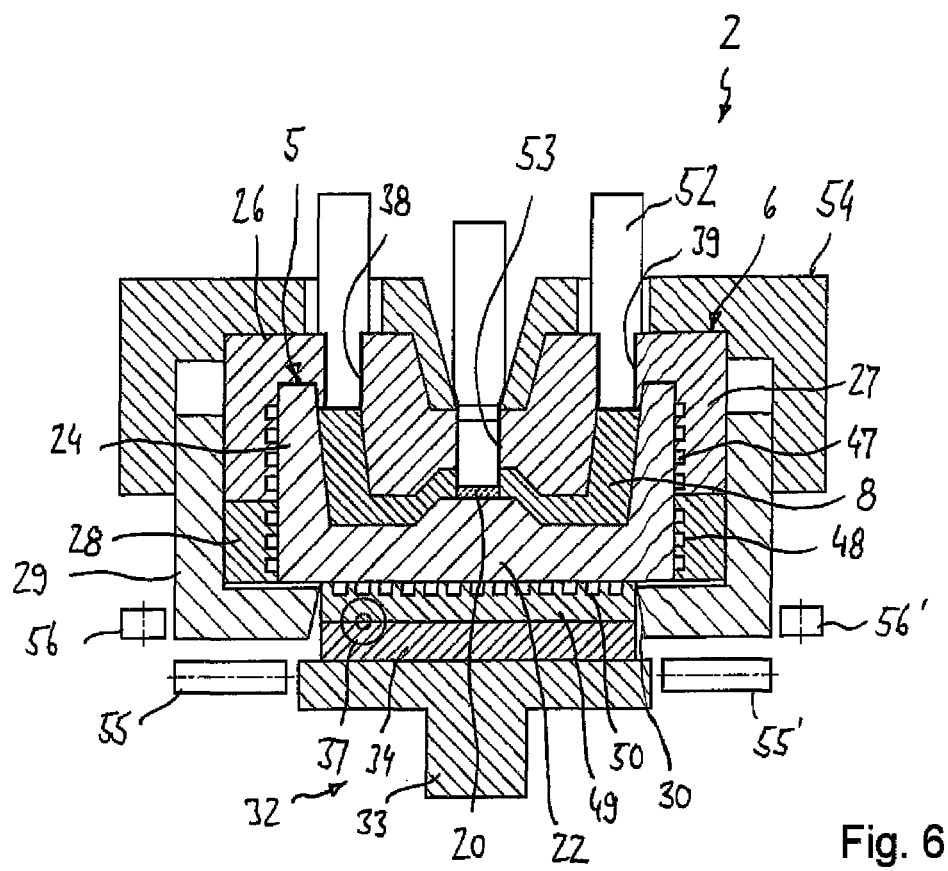
FIG. 6: a device for producing a metal component using a casting-and-forming tool in a further embodiment in a longitudinal sectional view during compressing.
Figure 7:
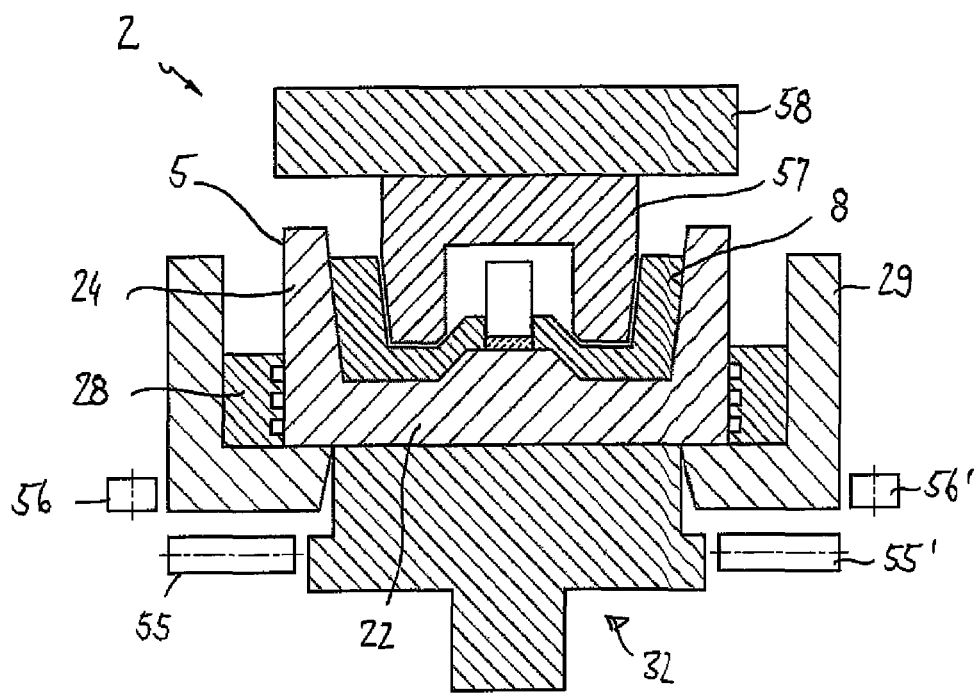
FIG. 7: the device according to FIG. 6 during the partial post-compressing, with removed upper part and put on forging tool.
Figure 8:
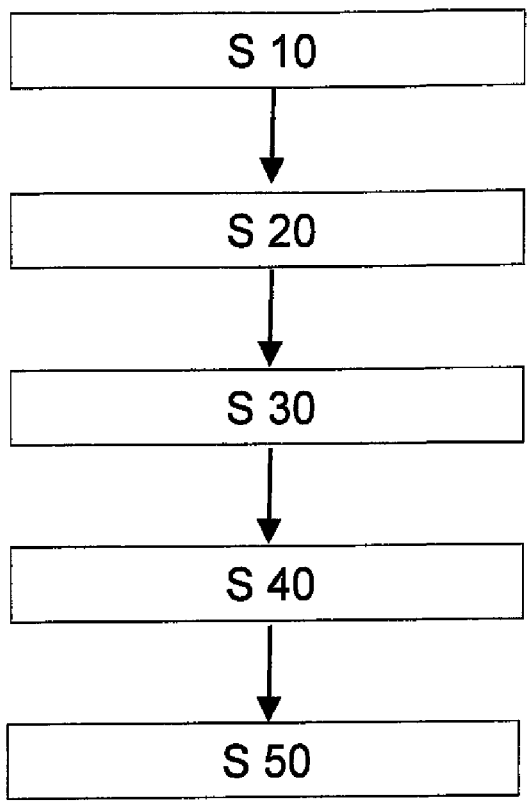
FIG. 8: a method for producing a metal component by a casting-and-forming tool.

FIGS. 1 to 9 are described in the following together. In FIGS. 1 to 4 a device 2 is shown for producing a metal component in a first embodiment, in FIGS. 5 and 6 a modified second embodiment is shown. FIGS. 7 and 8 show a corresponding method for producing and, respectively, a state diagram (phase diagram) of a metal alloy used for the production.

In the description, the general terms base part 5 and upper part 6 and casting-and-forming tool 4 are selected, as this tool is used for method steps which differ from each other. Thus, depending on the use casting and/or forming, also the terms cast, casting mold, die, forming parts, lower mold, upper mold, base can be assigned to the casting-and-forming tool and its essential components.

Figure 1:
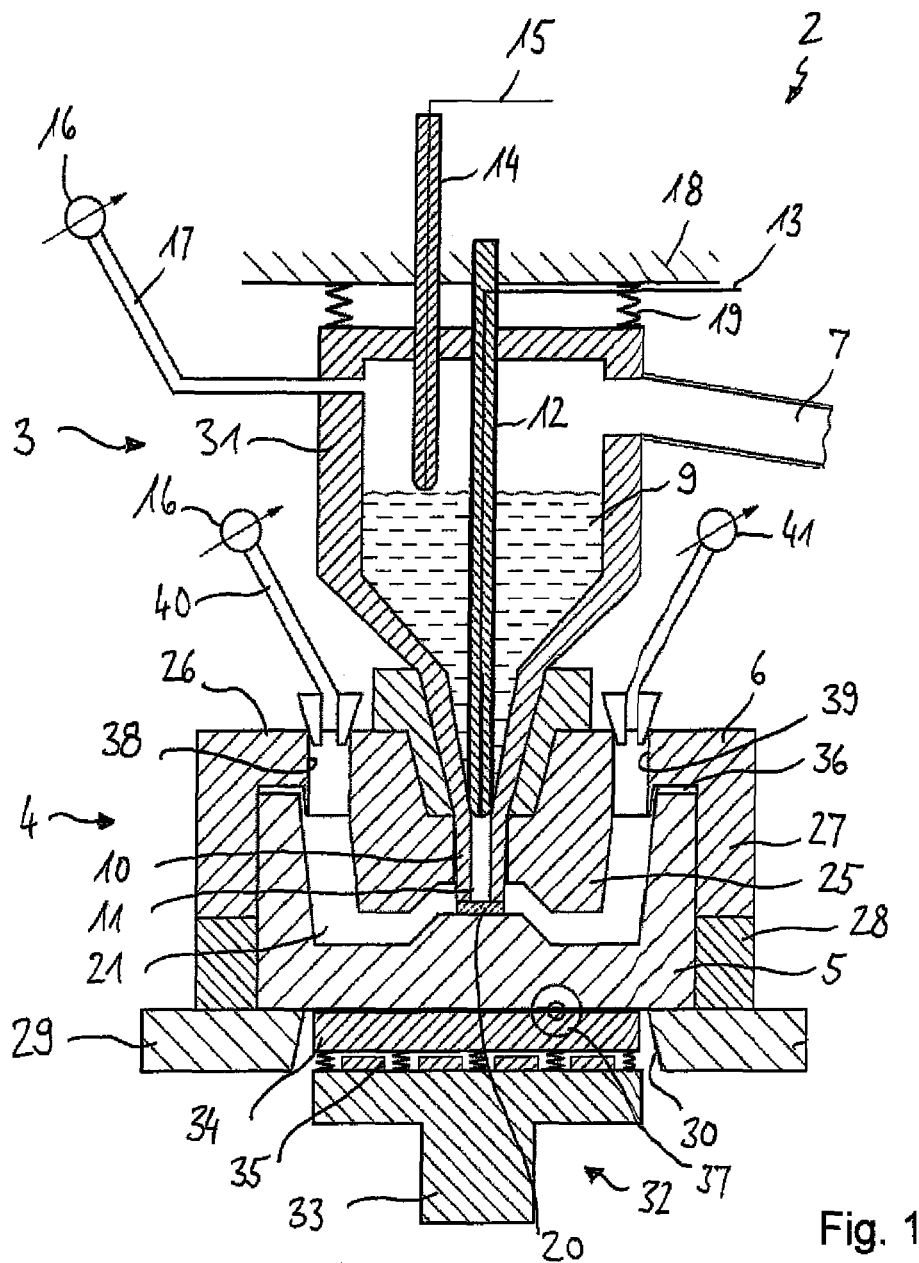
FIG. 1: a device for producing a metal component using a casting-and-forming tool in a first embodiment in a longitudinal sectional view.

The device 2 comprises a filling-and-dosing unit 3 with a dosing container 31 as well as a casting-and-forming tool 4 with a base part 5 and an upper part 6. A heating or melting device (not shown) can be arranged in front of the dosing unit 3, which serves for dosing and filling of liquid metal into the forming tool 4. The metal melt is fed from the melting device via the feed channel 7 to the dosing container 31. FIG. 1 shows the dosing container 31 filled with a melt 9 of liquid metal. The dosing container 31 is formed funnel-shaped and has at its lower end a feed pipe 10 with an outlet opening 11. An outlet valve 12 is provided in the dosing container 31, for selectively opening or closing the feed pipe 10 as necessary, so that optionally melt can flow from the dosing container into the casting-and-forming tool 4 arranged below or the flow can be interrupted. For determining the position of the outlet valve 12, a control sensor 13 is provided, which is in operative connection with a control unit for controlling the outlet valve 12. The outlet valve 12 and the outlet opening 11 can be manufactured from ceramics or triamet.

Furthermore, a fill level control unit 14 is provided in the dosing container 31, which can determine a signal representing the filling level, and transmit said signal to the control unit. The liquid metal amount can thus be measured during or before the filling. Furthermore, a temperature sensor 15 is provided which is configured to determine a signal representing the temperature of the metal, wherein said temperature signal is also processed by the control unit. The filling temperature in the container 31 is ideally above the temperature that is necessary during the casting.

Furthermore, the device 2 comprises an inert gas unit 16, with which an inert gas can be fed via a feed pipe 17 into the dosing container 3. By producing an inert gas atmosphere in the dosing container 3, the formation of an undesired oxide layer is prevented. Carrying out the process in an inert gas atmosphere is optional and can be used depending on the alloy. The dosing container 3 is swingingly attached to a stationary component 18 by a swinging mechanism 19, which for example can comprise one or more spring members.

The casting-and-forming tool 4, into which the melt can flow when the outlet valve 12 is opened, is arranged below the device 3. A filter 20, which delays the flow of the melt and causes a constant flow behavior into the base part 5, is arranged at the outlet opening 11 of the dosing container 3. The filter, which can also be designated as an in-flow damper, can comprise a wire mesh made from stainless steel. The filling of the casting mold 4 starts when the temperature of the liquid metal has cooled down to the casting temperature.

The upper part 6 is positioned on the base part 5, wherein the casting tool may not yet be completely closed before casting. A mold cavity 21 is formed between the parts 5, 6 of the casting-and-forming tool 4 into which cavity the melt can flow and fill the same. In the present case, the casting-and-forming tool 4 is formed such that an approximately pot-shaped cavity is enclosed. For this, the base part 6 has a base portion 22 with a central projection 23 that is arranged in the area of the outlet opening 11, as well as a circumferentially extending casing portion 24. The upper part 6, which also can be designated as upper mold, comprises a cone-shaped portion 25, a flange portion 26 connected to an upper end of the cone-shaped portion, as well as a circumferentially extending casing portion 27 that laterally surrounds the base part 5. The inner faces or contours of both tool parts 5, 6 are formed free of undercuts, so that an axial removal of the solidified component 8 is possible.

A positioning mechanism, e.g., including the member 28, is arranged between the upper part 5 and the base part 6 for holding said tool parts in a defined position, respectively at a defined distance relative to each other during the casting. The positioning member 28 is formed as an annular member, which is arranged between a base member 29 and the base part 6. The base member 29 is formed annularly or frame-like with a central opening 30. It serves as a support for the casting-and-forming tool 4, wherein the base part 5 is supported downwards on an edge encompassing the opening 30, and wherein the upper part 6 is supported downwards via the annular body 28 radially outside of the base part 5.

Furthermore, the device 2 comprises a force application mechanism 32 for moving the base part 5 relative to the upper part 6. The force application mechanism 32, which also can be designated as a stroke- or press mechanism, comprises a stroke member 33, which is vertically movable relative to the base member 29, and a support member 34, which is supported via elastic and/or dampening bearing means 35 against the stroke member 33. The stroke member 33 and the support member 34, respectively, pass through the through opening 30 of the base member 29. By lifting the stroke member 33, the support member 34 and the base part 5 supported thereon are loaded vertically upwards. In this case, the base part 5 approaches the upper part 6, which is held stationary, wherein the gap 36 formed between the two parts 5, 6 of the casting-and-forming tool 4 is at least partly closed. By moving the base part 5 towards the upper part 6, the component arranged therebetween can be compacted so that a fine-grained, free-of-pores structure is produced with a high strength. Vibrations can be introduced into the casting-and-forming tool 4 via a vibration mechanism 37, which is arranged on the base part 5 and only shown schematically. Furthermore, the upper part 6 comprises through openings 38, 39 by means of which a duct 40 of the inert gas unit and a suction unit 41 are connected.

Figure 2:
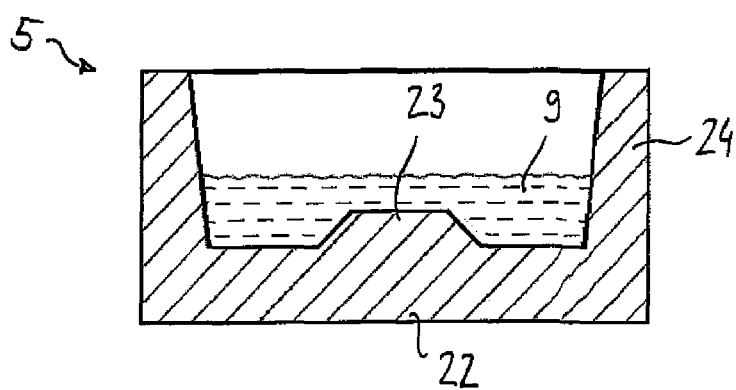
FIG. 2: the base part of the casting-and-forming tool of FIG. 1 in detail.

In the embodiment of FIG. 1 the base part 5, which is shown as a detail in FIG. 2, is formed integrally. The undercut-free shape of the base part is visible, which provides for an axial removal of the workpiece after complete solidification. The base part 5 is formed rotation-symmetrically.

Figure 3:
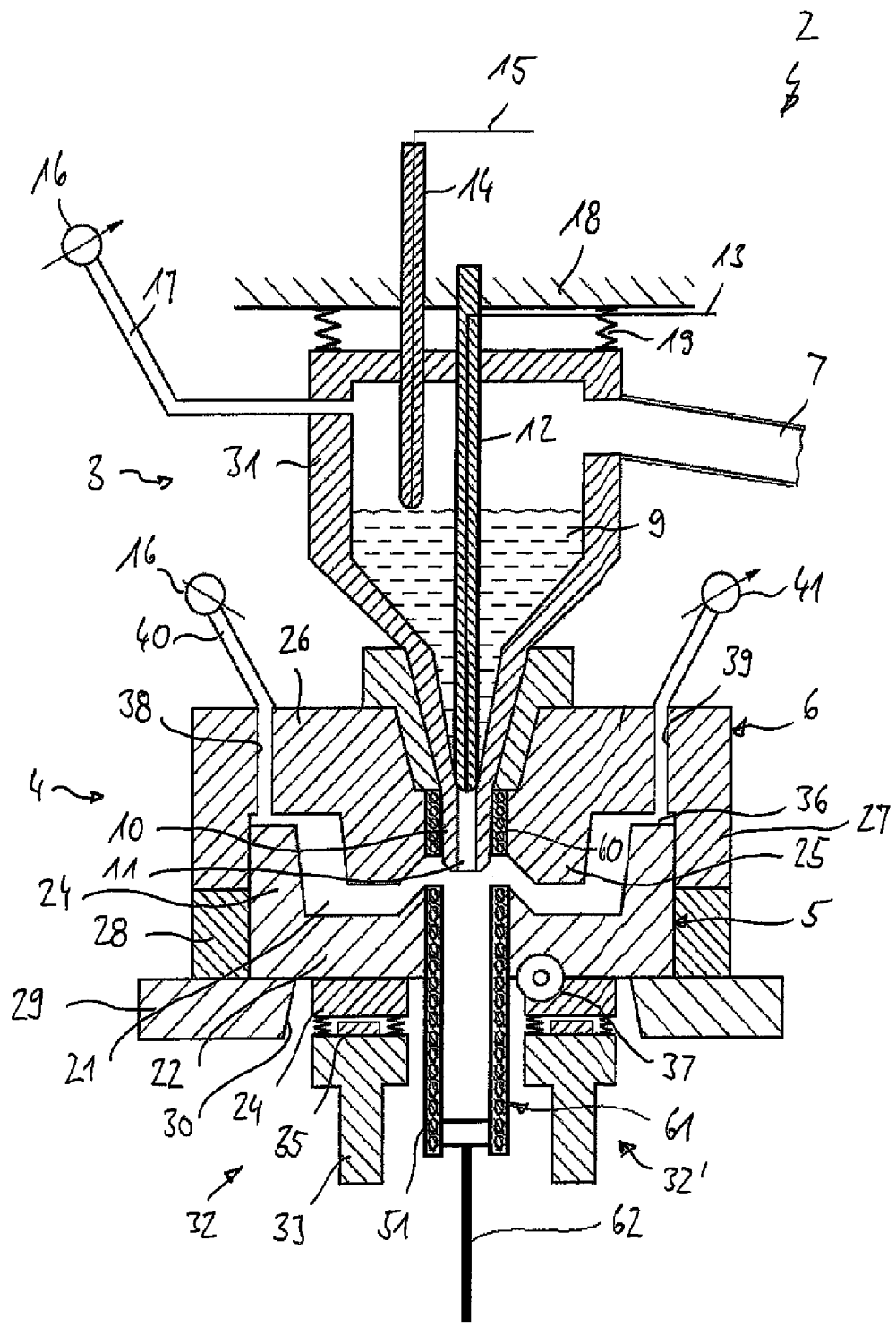
FIG. 3: a device for producing a metal component using a casting-and-forming tool in a second embodiment in a longitudinal sectional view.

FIG. 3 shows a device according to a modified second embodiment. This second embodiment corresponds to a large extent to the embodiment of FIG. 1, so that concerning the common features the above description is referred to. In this case, the same or one another corresponding components are provided with the same reference numerals as in FIG. 1.

An essential difference of the present embodiment is that the liquid metal alloy is cooled during the discharge from the dosing container 3 into the casting-and-forming tool 4. For this, a cooling unit 60 is provided around the feed pipe 10 on the inner wall portion of the upper part 6. Furthermore, a reservoir 61 is provided at the base part 5, into which the metal alloy can flow. The reservoir 61 is enclosed by an insulating or heating device 51, which holds the metal on a defined temperature or within a specific temperature range, respectively. The reservoir 61 is attached at a central portion of the base part 5 and extends vertically downwards. At the lower end of the reservoir 61, a controllable piston 62 is provided. By retracting the piston 61 in the reservoir 61, which serves as cylinder, the metal arranged in the reservoir can be pressed into the mold cavity 21.

The operating mode of the present embodiment is as follows. The melt 9 is cooled during the discharge, wherein the discharge velocity is configured such that the liquid metal alloy is transferred into a semi-solid-state by the cooling unit 60. A semi-solid state means a state, in which the temperature of the alloy is around or approximately below the liquidus temperature TL. In the reservoir 61, which can also be referred to as collecting vessel, the alloy is held in or slightly above the semi-solid-state, which means at or slightly above the liquidus temperature TL. Depending on the metal alloy, this state has to be adjusted in the range of few degrees of temperature. After the complete discharge of the alloy from the dosing container 31, the inlet is closed and the piston 62 presses the alloy in the semi-solid state into the casting-and-forming tool 4. For this the tool parts 5, 6 of the casting-and-forming tool can be adjusted to temperatures that are at least 10% of the solidus temperature TS below the solidus temperature. After the filling, the step of compressing of the component is carried out in the casting-and-forming tool 4, and optionally the partial post-compression.

Apart from that the foregoing, the structure and operating mode of the present embodiment according to FIG. 3 corresponds to that of FIGS. 1 and 2, so that to that extent reference is made to the above description.

Figure 4:
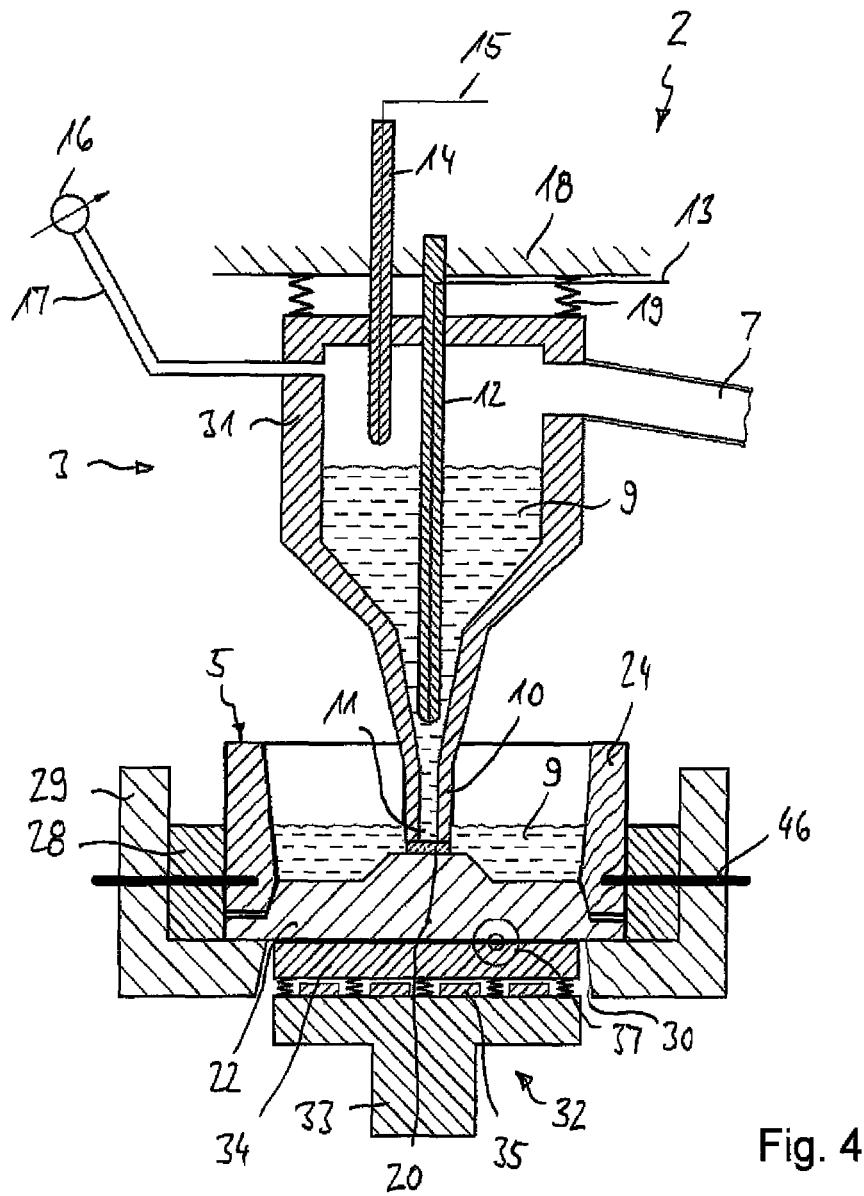
FIG. 4: a device for producing a metal component using a casting-and-forming tool in a third embodiment in a longitudinal sectional view during casting.

FIGS. 4 and 5 show a device 2 according to a further embodiment. This largely corresponds to the embodiment of FIG. 1, so that concerning the common features reference is made to the above description. In this case the same or one another corresponding components are provided with the same reference numerals as in FIG. 1.

A first difference compared to the embodiment of FIG. 1 is that the casting is carried out while the upper part 6 is removed from the base part 5 and is held at a distance thereto. Only after the filling of the melt is the upper part 6 then put onto the base part 5, which is approached up to a defined distance and the process is continued as described in connection with FIG. 1.

A further characteristic is that the base part 5 is constructed from two parts, made up from a base portion 22 (base body) and a casing portion 24 (casing body). The base portion 22 and the casing portion 24 have complementary conical abutment faces 42, 43 for centering and supporting the two bodies relative to each other. Between an end face of the casing portion 24 and a radial face of the base portion 22, a radial gap 44 is formed in the assembled condition. An annular groove 45 is provided in an outer circumferential face of the annular casing portion 24, which can be engaged by locking means 46 to fix the casing portion 24 relative to the base member 29. The base member 29 is formed pot-like in the present case with a disc portion and a cylindrical portion. The positioning mechanism 28, which can also be referred to as positioning or side member, is interposed radially between the base member 29 and the base part 5. The locking means 46 penetrate through the positioning member 28 and are supported in the annular portion of the base member 29. Apart from that, the embodiment of FIGS. 4 and 5 correspond in design and operating mode to that of FIGS. 1 and 2, so that concerning these reference is made to the above description.

FIG. 6 shows a device in another embodiment. This embodiment largely corresponds to the embodiment of FIG. 1, so that concerning the common features reference is made to the above description. In this case the same or one another corresponding components are provided with the same reference numerals as in FIGS. 1 and 2.

A difference in relation to the embodiment of FIG. 1 is that the casing portion 27 of the upper part 6 and the positioning member 28 have respectively at their inner faces cooling units 47, 48, facing the base part 5. The cooling units 47, 48 can be formed as cooling ribs or cooling channels, through which a cooling fluid can flow. Also the base portion 22 of the base part 4 is cooled in the present embodiment. In this embodiment, a plate-like intermediate member 49 is arranged between the support member 34 and the base portion 22, which has a cooling device 50 in form of cooling ribs or cooling channels at an upper side thereof, facing the base portion 22. The vibration mechanism 37 is arranged between the intermediate member 49 and the support member 34. Heat of the base part 5 of the casting-and-forming tool 4 can be discharged through the cooling units 47, 48, 50, so that the component solidifies quicker.

The device 2 of FIG. 6 is shown during and/or after the step of compressing (S30). For this the base part 5 is lifted off by means of the force application mechanism 32 from the stationary base member 29, which is formed in the present case as a support frame with a base and casing portion. The base part 5 is lifted up to the upper part 6, so that the gap 36 is closed and the solidifying component is compressed. Before the compression, the through openings 38, 39 are closed, so that the solidifying or already solidified material is not pressed out of the mold cavity. For this embodiment, closing cylinders 52 are provided, which enter the through openings 38, 39 and the inlet opening 53 and produce a counter pressure on the upper part 6.

During the compression step, the upper part 6 is supported on an upper support frame 54, which is held stationary. The lower support frame 29 with all components supported thereon is lifted in direction towards the upper support frame 54. In the present embodiment, first and second conveying rollers 55, 56 are provided for vertically and horizontally guiding the lower support frame 29 and for moving said frame linearly in the advance direction. By lifting the lower support frame 29, a distance is formed between the support rollers 55 and the lower side of the lower support frame 29, as shown in FIG. 6. At the latest after the step of compression, a completely solidified component 8 is present.

FIG. 7 shows the device of FIG. 6 in a following process step S40. The force application mechanism 32 is only shown schematically here. It is visible, that the upper support frame 54, the closing cylinders 52 and the upper part 6 have been removed from the remaining assembly.

Instead of the upper part, a forging tool 57 is now moved into the component. Partial areas of the component are post-compressed by the forging tool 57, which leads to especially high strengths in these partial areas. In the present case, the forging tool 57 has an annular portion with an annular forging face 58, which axially acts on the component so as to compress and plastically deform it. The forging tool 57, which can also be designated as a die, is attached and axially supported on a holder 58. The partial post-compression—as already the compression—is carried out by lifting the lower support frame 29 including the base part 5 by means of the lifting device.

Apart from that, the embodiment corresponds in layout and operating mode to that of FIG. 6, so that concerning this reference is made to the above description.

In FIG. 8, a method for producing a metal component is shown as a flow chart with the method steps S10 to S50. A forgeable alloy can be used for the process, to achieve a microstructure with high strength.

In a first method step S10, a melt of a metal alloy is discharged into the casting-and-forming tool 4 at a first pressure (P1), wherein the filling of the whole amount of melt is carried out non-pressurized, i.e., at atmospheric pressure. The melt is filled from above from the dosing container 31 into the casting-and-forming tool 4. During the filling of the melt from the dosing container 31 into the casting mold, vibrations can be introduced into the latter. It is also possible that the outlet of the dosing container 31 is controlled by cooling and adjusting the discharge velocity such that the liquid metal is transferred into a semi-solid state.

After the melt has been completely filled into the casting-and-forming tool 4, the filling-and-dosing unit 3 and the casting-and-forming tool 4 are separated from each other and the vibration mechanism 37 is switched off. The casting-and-forming tool 4 can be moved on a conveying unit to the next process station.

Next, in the method step S20, pressure is applied to the metal alloy arranged in the mold cavity. For this, a pressure P2 is built-up between the base part 5 and the upper part 6, is the pressure P2 being greater than the atmospheric pressure, i.e., the first pressure P1. This pressure P2 can, for example, be produced by the dead weight of the upper part 6. All openings of the casting-and-forming tool 4 have to be closed before force application, so that no material is unintendedly pressed out of the tool. The step of applying pressure of the melt can be carried out in a component-shell-temperature range T2 of around the liquidus line TL up to above the solidus line TS of the metal alloy, this means TS<T2<TL. Before applying pressure, the material is still liquid. At the end of the step of applying pressure the material is at least partially in a dough-like state.

The advancing process of solidification of the material during the method step 20 can be influenced, as required, by corresponding heating of the base part 5 and/or the upper part 6. For example, the base part 5 can be heated to a higher temperature than the upper part 6, at which upper part a solidification of the metal alloy then takes place more quickly. For heating, respectively cooling, the parts 5, 6 of the casting-and-forming tool 4 can have one or more cooling circuits, wherein at least one temperature sensor is assigned to each cooling circuit. The cooling can be carried out in a water-air mixture in a ratio according to requirements to ensure a specific solidification process in the component.

After the step of applying pressure (S20), when the material is at least partially in a dough-like or mostly solidified state to form the component, a compression of said component is carried out in the next method step S30. The step of compressing is carried out by relative moving of the base part 5 towards the upper part 6 such that a third pressure P3 is generated, which is larger than the second pressure P2 in the method step S20. The compressing takes place by pressing the lower part 5 in a direction of the upper part 6 with high forces. The compressing may start only when the metal alloy is at least mostly solidified, i.e., is in the semi-solid state. The compressing can be carried out at a component-shell-temperature T3, which is lower than the component-shell-temperature T2 of the metal alloy during the method step of applying pressure S20. Furthermore, as lower limit of the temperature T3, half of the solidus temperature TS of the metal alloy can be used; this means T2>T3>0.5TS. The end of the forming process is defined by reaching an end position of the relative movement of the upper part towards the base part and by achieving a predetermined temperature. During the step of compressing S30, the component only experiences a comparably low degree of deformation of less than 15%, especially less than 10%, or less than 5%. Pores in the component are closed during compressing, so that the microstructure of the workpiece is improved.

As a further method step S40, a partial post-compressing of the completely solidified component is provided after the step of compressing S30. The partial post-compressing is carried out by introducing a forging tool into the base part of the casting-and-forming tool, or by lifting the base part 5 against the forging tool (die). Thus, the component is compressed and plastically deformed in partial areas. During the partial post-compressing, the component is again subjected to larger forces than during the step of compressing S30. A forging-similar microstructure is produced in the post-compressed areas, which can withstand especially high loads.

After the partial post-compression (S40), a flow forming of partial areas of the component can be carried out in a further method step S50. By means of flow forming, outer or inner contours with undercuts can be produced in the deformed component.

After the step of flow forming S50, further method steps, especially burring, metal cutting or mechanical post-processing, quality control like x-raying, and/or varnishing can follow.

Figure 9:
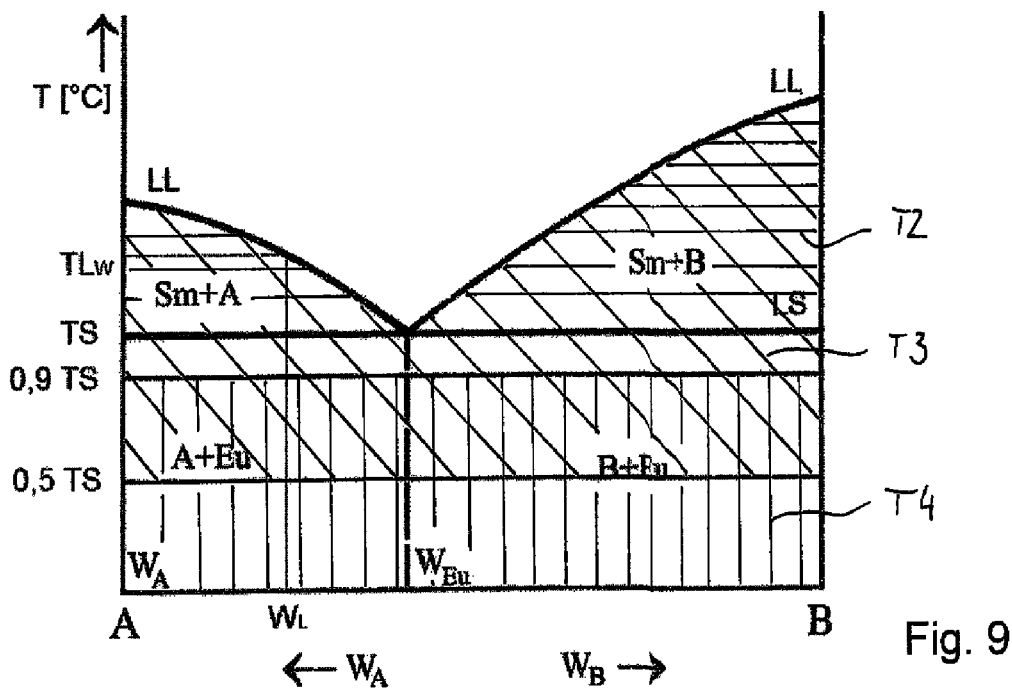
FIG. 9: a state diagram (phase diagram) for a metal alloy for manufacturing a component according to the method of FIG. 8.

With the method and device disclosed herein, cast blanks can be produced in several steps in the same base part, by casting (S10), following applying pressure (S20), following compression/deformation (S30) and optional partial material post-compression (S40). The pressure application (S20) takes place above the solidus temperature (liquid up to doughy state) of the respectively used alloy. FIG. 9 shows a state diagram (phase diagram) for a metal alloy for manufacturing a component according to the method or with the device according to the invention. On the x-axis, the ratio of the amount of a metal alloy (WL) is stated, which comprises XA % of a metal A and XB % of a metal B. On the Y-axis, the temperature (T) is given. The temperature range T2 for the step of pressure application, which is preferably below the liquidus temperature (TL) and above the solidus temperature TS (TL>T2>TS), is horizontally hatched in FIG. 9. In dependency of the process time at the pressure application (S20) a remaining degree of deformation of less than 15% remains for the following compressing (S30). The step of compressing (S30) takes place especially in a temperature range T3 between the temperature T2 and half the solidus temperature 0.5TS (T2>T3>0.5 TS). This range is hatched from left top to right bottom in FIG. 9. Optionally, a partial metal post-compressing (S40) takes place at stress-exposed component regions, which can be achieved by means of introducing a die from above. This especially takes place at a temperature T4 below the temperature T3, respectively below 90% of the solidus temperature (T3>T4 and/or T4<0.9 TS). This temperature range is shown vertically hatched in FIG. 9.

The method offers more degrees of freedom concerning the design and shape as known casting methods, as for producing raw cast parts casting specific cross-sections are not necessary to the extent necessary there. The whole manufacturing process takes place in a simple base part 5 with the optional use of a die 57. The upper part 6 and, where applicable, one or more side parts which may be used optionally, have at the beginning of the flow process distinctly lower temperatures (temperature difference of up to 50% of the solidus temperature) than the base part 5. By this manufacturing process, a microstructure with kneading texture with better mechanical properties can be achieved from a quickly cooling casting microstructure.

The invention claimed is:

1. A method of producing a metal component, comprising:
    casting a melt of a metal alloy in a casting-and-forming tool that comprises a base part and an upper part, the base part including a base portion and a casing portion and the upper part including a cone-shaped portion, wherein the melt is filled into the tool into at least one of the base part and a reservoir provided at the base part of the tool at a first pressure, and fills a cavity formed between the base part and the upper part, the cavity including a disc cavity portion formed between an end face of the upper part and the base portion of the base part, and, extending from a peripheral region of said disc cavity portion, an annular rim cavity portion formed between the cone-shaped portion of the upper part and the casing portion of the base part;
    applying pressure to the melt between the base part and the upper part of the tool while the melt is solidifying, wherein the solidifying melt is pressurized with a second pressure that is higher than the first pressure, and wherein the step of applying pressure to the solidifying melt is carried out at a first component-shell-temperature below a liquidus line and above a solidus line of the metal alloy, wherein the upper part is set to a lower temperature than the base part at least during one of the steps of casting and applying pressure; and
    after the step of applying pressure, when the melt is at least partly solidified to form a component, compressing the component by moving at least one of the base part and the upper part relative to the other one of the base part and the upper part such that a cavity volume of the disc cavity portion and of the annular rim cavity portion is reduced, wherein the component is compressed with a third pressure that is higher than the second pressure;
    wherein the compressing with the third pressure starts only when the melt is in a semi-solid state between a liquid and a solid phase, wherein the compressing is carried out at a second component-shell-temperature that is lower than the first component-shell-temperature and at a minimum half of the solidus temperature of the metal alloy, and wherein the step of compressing is carried out such that the component is deformed by a degree of deformation of less than fifteen percent.

2. The method of claim 1, wherein the upper part of the casting-and-forming tool is held in a partially opened position relative to the base part during casting of the melt.

3. The method of claim 1, wherein a dosing unit is provided for casting the melt, wherein the melt is cooled during the casting by a cooling unit at an outlet of the dosing unit.

4. The method of claim 1, wherein the compressing is carried out by a relative movement between the base part and the upper part, wherein one of the base part and the upper part of the casting-and-forming tool is held stationary.

5. The method of claim 1, wherein the upper part is set to a lower temperature than a temperature of the base part during the step of compressing.

6. The method of claim 1, the casing portion of the upper part is set to a lower temperature than a temperature of the base portion of the base part at least during one of the step of applying pressure and the step of compressing.

7. The method of claim 1, further comprising:
    after the step of compressing, and when the component is completely solidified, post-compressing the completely solidified component by moving a forging tool into the base part of the casting-and-forming tool, such that the component is compressed and plastically deformed by the forging tool at least in some areas.

8. The method of claim 7, wherein the partial post-compressing is carried out such that the component is deformed by a total degree of deformation of less than 15% by said compressing and post-compressing.

9. The method of claim 8, further comprising:
    after the post-compressing flow forming the component to produce a final contour.

10. A method of producing a metal component, comprising:
    casting a melt of a metal alloy in a casting-and-forming tool that comprises a base part and an upper part, the base part including a base portion and a casing portion, and the upper part including a cone-shaped portion, wherein the melt is filled into the tool into at least one of the base part and a reservoir provided at the base part of the tool at a first pressure, and fills a cavity formed between the base part and the upper part, the cavity including a bottom cavity portion formed between an end face of the upper part and the base portion of the base part and, extending from a peripheral region of said bottom cavity portion, an annular cavity portion formed between the cone-shaped portion of the upper part and the casing portion of the base part;

applying pressure to the melt between the base part and the upper part of the tool while the melt is solidifying, wherein the solidifying melt is pressurized with a second pressure that is higher than the first pressure; and when the melt is at least partly solidified to form a component, compressing the component by moving at least one of all of the base part and all of the upper part relative to the other one of the base part and the upper part, wherein the component is compressed with a third pressure that is higher than the second pressure such that a cavity volume of the bottom cavity portion and of the annular cavity portion is reduced;

wherein the compressing with the third pressure starts only when the melt is in a semi-solid state between a liquid and a solid phase.

11. The method of claim 10 wherein the base portion and the casing portion are fixed relative to one another while applying pressure to the melt and while compressing the component.

* * * * *